Patented Aug. 9, 1938

2,126,133

UNITED STATES PATENT OFFICE 2,126,133

SWEETPOTATO SIRUP

Howard S. Paine, Chevy Chase, Md., and Elias Yanovsky, Washington, D. C.; dedicated to the free use of the People of the United States of America No Drawing. Application July 12, 1937, Serial No. 153,198

1 Claim. (Cl. 99—50)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

We hereby dedicate the invention herein described to the free use of the People of the United States of America to take effect on the granting of a patent to us.

It has been the practice among many brewers to add sugar or sugar solutions (sirups) to beer wort before fermenting it for production of beer. Sugar or sugar solutions used in this way as a brewing adjunct increase the yield of beer, make possible certain economies of operation, and also sometimes impart certain desirable qualities to the finished beer. Among the sugars contained in the various brewing adjuncts which have been used may be mentioned corn sugar (dextrose), invert sugar, sucrose, maltose and mixtures of these sugars. Some of the sirups and dry adjuncts contain also variable proportions of dextrins and relatively small amounts of non-sugar substances, such as ash constituents, proteins, etc.

One of the disadvantages of such sirups or mixtures consisting principally of sugars is that, although they supply a considerable proportion of alcohol which is required in brewing beer, they are not sufficiently flexible in composition to provide any required proportion of fermentable and non-fermentable constituents which may be desired. Thus, under some conditions in brewing beer a higher proportion of non-fermentable constituents to fermentable constituents may be desired, and under all the various conditions of brewing a considerable range in proportion of fermentable to non-fermentable constituents may be desired.

We have prepared a sirup which is very suitable as a brewing adjunct from the above and other standpoints. Sweet potatoes are known to be very rich in carbohydrates, especially starch. When sweet potatoes are ground and mixed with water and subjected to the action of a suitable concentration of acid, and also to heat, the starch is converted into sugars and dextrins and 90% or more of the dry matter of sweetpotatoes may be transformed into soluble substances, which remain in solution in the sirup, thus insuring a high yield of sirup per bushel of potatoes. Heating is conducted preferably under pressure. Hydrochloric, sulphuric and other acids may be used as hydrolytic agents but hydrochloric acid is preferred. After the necessary conversion is accomplished, the resulting liquid material, which contains suspended fiber and other insoluble constituents, is filtered and a suitable proportion of sodium carbonate is added for the purpose of adjusting the liquid to the pH desired. The liquid is then treated with suitable decolorizing carbon, and after filtration from same, is boiled down to the desired concentration of solids. By regulating the time and temperature of heating, the pressure and the concentration of acid, it is possible to adjust the ratio of fermentable sugars to non-fermentable solids within wide limits.

It has usually been regarded as impracticable to produce a satisfactory sirup by direct acid hydrolysis of unpurified raw material such as whole sweetpotatoes, including the skin. It has been customary to purify such raw materials as in the extraction of starch from corn for production of glucose by acid hydrolysis or as an alternative to use malt or other diastatic agent as a converting agent, as in the action of malt on various grains. However, it has been found that by carefully controlling the conditions of hydrolysis there can be obtained an extract which is clear and of satisfactory color and which, after treatment with suitable decolorizing carbon and concentration, yields a sirup of permanent clarity and of satisfactory color and flavor.

In attempts which have been made previously to produce a sirup from sweetpotatoes by using malt as a converting agent, there was obtained a pasty mass which, on account of the high proportion of insoluble or unconverted material, required considerable manipulation in order to filter off the liquid portion. Also, because of the high proportion of unconverted material the yield of sirup per bushel of sweetpotatoes was low (about 1.35 gallons per bushel of potatoes). On the other hand, the material obtained as a result of acid hydrolysis of sweetpotatoes (including skins) contained a relatively small portion of insoluble unconverted material and filtered very readily. A considerably higher yield of sirup (over 2 gallons per bushel of potatoes) was obtained by the method of acid hydrolysis than by the malt conversion method. The cost of manufacturing sweetpotato sirup by this method is materially lower than by the malt conversion method. The sirup produced by the acid hydrolysis method herein described is easily fermented by ordinary beer yeast and the non-sugar constituents, the proportion of which can be adjusted within a wide range, give the necessary "body" or unfermented "extract" to the finished beer. It is also feasible to mix this sweetpotato sirup with another sirup such as one containing principally sucrose or sucrose and invert sugar (derived from sugarcane) so as to produce a mixed sirup suitable for use as a brewing adjunct. In this way, a still greater range in the proportion of fermentable to non-fermentable constituents can be attained. Flavor is of importance in making such mixtures and it has been found that a satisfactory flavor is obtained when sweetpotato sirup prepared by acid hydrolysis is mixed with sirups or other liquid products (derived from sugarcane) which contain essentially sucrose and/or invert sugar.

A typical example of the method of producing sweetpotato sirup by acid hydrolysis is as follows: Ground, washed sweetpotatoes (including skins) are mixed with an equal weight of water and concentrated hydrochloric acid is added in proportion of two grams of acid to one pound of sweetpotatoes. However, any strong acid, such as sulphuric or nitric acid may be substituted for the concentrated hydrochloric acid named. In practice, the sweet potatoes may be washed in any suitable type of continuous potato washer and then ground in a hammer mill. The mixture is heated under pressure at 125° C. for 3½ hours. The liquid extract is then filtered off, the filtrate is adjusted to required pH (usually about 5.0 pH) by addition of sodium carbonate and is then treated with suitable decolorizing carbon for removal of color. After filtration from the carbon, the extract is concentrated to a sirup of 70 to 80 percent solids content. One sirup of 80 percent solids content prepared in this way contained 45 percent of fermentable sugars and 35 percent of non-fermentable solids. By varying the conditions of hydrolysis, the percentage of fermentable sugars can be materially increased through conversion of dextrins.

It should be understood that we do not limit ourselves to the above conditions of temperature, time and concentration of acid but, on the contrary, vary these factors in order to obtain various ratios of fermentable and non-fermentable solids in the resulting sirup.

Having thus described our invention, what we claim for Letters Patent, is:

The method of producing a fermentable sirup, comprising mixing ground sweetpotatoes with an equal weight of water and a strong acid, in the proportion of substantially 2 grams of acid to substantially 1 pound of sweetpotatoes, thence heating the mixture under pressure at substantially 125° C. for substantially 3½ hours, thence filtering the liquid extract, thence subjecting the filtrate to the action of an alkali until it is adjusted to substantially 5.0 pH, thence adding a decolorizing carbon, thence removing the carbon, and thence concentrating the remaining extract to a sirup content ranging from 70 to 80% solids.

HOWARD S. PAINE.
ELIAS YANOVSKY.